US008863773B2

(12) United States Patent
Khoshnevis

(10) Patent No.: US 8,863,773 B2
(45) Date of Patent: Oct. 21, 2014

(54) FLUID METERING DEVICE USING FREE-MOVING PISTON

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 361 days.

(21) Appl. No.: 12/611,744

(22) Filed: Nov. 3, 2009

(65) Prior Publication Data

US 2010/0116368 A1  May 13, 2010

Related U.S. Application Data

(60) Provisional application No. 61/113,148, filed on Nov. 10, 2008.

(51) Int. Cl.
*F16K 27/00* (2006.01)
*G01F 3/14* (2006.01)

(52) U.S. Cl.
CPC ........................................ *G01F 3/14* (2013.01)
USPC ................................ 137/599.07; 137/601.01

(58) Field of Classification Search
CPC .............................. B05C 5/0225; G01F 11/04
USPC .............. 137/599.04, 599.06, 599.07, 601.01
See application file for complete search history.

(56) References Cited

U.S. PATENT DOCUMENTS 3,292,824 A * 12/1966 Arp et al. ....................... 222/250
4,040,443 A * 8/1977 Okada et al. .................. 137/546
4,240,291 A    12/1980 Andersson et al.
4,610,163 A *  9/1986 Johannesson .................... 73/250
4,654,802 A *  3/1987 Davis ............................ 700/265

(Continued)

FOREIGN PATENT DOCUMENTS

| EP | 0443276 A1 | 2/1990 |
| JP | 61-091518 A1 | 5/1986 |
| JP | 63-298122 A1 | 12/1988 |
| WO | 2009055580 A2 | 4/2009 |

OTHER PUBLICATIONS

PCT Application No. PCT/US2009/063172, International Search Report and Written Opinion of the International Searching Authority, mailed Jun. 11, 2010.

*Primary Examiner* — John K Fristoe, Jr.
*Assistant Examiner* — Reinaldo Sanchez-Medina
(74) *Attorney, Agent, or Firm* — McDermott Will & Emery LLP

(57) ABSTRACT

A fluid metering device may meter the flow of fluid. The device may have a main chamber and a piston configured and oriented to reciprocate within the main chamber. The piston may be configured and oriented to define a first and a second sub-chamber whose volumes vary inversely as a function of the position of the piston during its reciprocation. The fluid metering device may have a first inlet valve configured to controllably regulate the flow of fluid into the first sub-chamber, a first outlet valve configured to controllably regulate the flow of fluid out of the first sub-chamber, a second inlet valve configured to controllably regulate the flow of fluid into the second sub-chamber, and a second outlet valve configured to controllably regulate the flow of fluid out of the second sub-chamber. A valve controller may be configured to control each of the values in a manner that causes fluid to flow through the each of the sub-chambers at an average rate that substantially tracks a control signal which is delivered to the valve controller.

16 Claims, 2 Drawing Sheets

(56) References Cited

U.S. PATENT DOCUMENTS

| | | | |
|---|---|---|---|
| 5,174,320 A * | 12/1992 | Allen | 137/1 |
| 5,220,837 A * | 6/1993 | Silverwater | 73/714 |
| 6,745,838 B2 * | 6/2004 | Watson | 166/310 |
| 6,973,936 B2 * | 12/2005 | Watson | 137/1 |
| 7,069,944 B2 * | 7/2006 | Morikawa et al. | 137/487.5 |
| 7,153,454 B2 | 12/2006 | Khoshnevis | |
| 7,452,196 B2 | 11/2008 | Khoshnevis | |
| 7,574,925 B2 | 8/2009 | Khoshnevis | |
| 7,641,461 B2 | 1/2010 | Khoshnevis | |
| 2005/0196482 A1 | 9/2005 | Khoshnevis | |
| 2007/0138678 A1 | 6/2007 | Khoshnevis | |
| 2007/0138687 A1 | 6/2007 | Khoshnevis | |
| 2007/0148006 A1 | 6/2007 | Khoshnevis | |
| 2007/0181519 A1 | 8/2007 | Khoshnevis | |
| 2007/0286674 A1 | 12/2007 | Khoshnevis | |
| 2008/0017663 A1 | 1/2008 | Khoshnevis | |
| 2008/0121013 A1 | 5/2008 | Khoshnevis | |
| 2010/0025349 A1 | 2/2010 | Khoshnevis | |

* cited by examiner

ND MOVING PISTON

CROSS-REFERENCE TO RELATED APPLICATION[S]

This application is based upon and claims priority to U.S. Provisional Patent Application Ser. No. 61/113,148, entitled "Metering Device For Flow Control Of Abrasive Viscous Fluids," filed Nov. 10, 2008, the entire content of which is incorporated by reference.

This application is also related to the following: U.S. patent application Ser. No. 11/040,401, entitled "Robotic Systems for Automated Construction," filed Jan. 21, 2005; which claims priority to U.S. Provisional Application Ser. No. 60/537,756, entitled "Automated Construction Using Extrusion," filed Jan. 20, 2004; U.S. patent application Ser. No. 11/040,518, entitled "Mixer-Extruder Assembly," filed Jan. 21, 2005; which claims priority to U.S. Provisional Application Ser. No. 60/537,756, entitled "Automated Construction Using Extrusion," filed Jan. 20, 2004; U.S. patent application Ser. No. 11/552,885, entitled "Extruded Wall with Rib-Like Interior," filed Oct. 25, 2006; which claims priority to U.S. Provisional Application No. 60/730,560, entitled "Contour Crafting Nozzle and Features for Fabrication of Hollow Structures," filed Oct. 26, 2005; U.S. patent application Ser. No. 11/552,741, entitled "Deployable Contour Crafting," filed Oct. 25, 2006; which claims priority to U.S. Provisional Application No. 60/730,418, entitled "Deployable Contour Crafting Machine," filed Oct. 26, 2005; U.S. patent application Ser. No. 11/556,027, entitled "Material Delivery System Using Decoupling Accumulator," filed Nov. 2, 2006; which claims priority to U.S. Provisional Application No. 60/733,451, entitled "Material Delivery Approaches for Contour Crafting," filed Nov. 4, 2005; U.S. patent application Ser. No. 11/556,048, entitled "Dry Material Transport and Extrusion," filed Nov. 2, 2006; which claims priority to U.S. Provisional Application No. 60/733,451, entitled "Material Delivery Approaches for Contour Crafting," filed Nov. 4, 2005; U.S. patent application Ser. No. 11/733,096, entitled "Compliant, Low Profile, Independently Releasing, Non-Protruding and Genderless Docking System for Robotic Modules," filed Apr. 9, 2007; which claims priority to U.S. Provisional Application No. 60/744,483, "Compliant, Low Profile, Non-Protruding, and Genderless Docking System for Robotic Modules," filed Apr. 7, 2006, matter no. 28080-202; U.S. patent application Ser. No. 11/780,978, entitled "Bag Lifting and Emptying System," filed Jul. 20, 2007; which claims priority to U.S. Provisional Application No. 60/807,867, entitled "Lifting and Emptying System for Bagged Materials," filed Jul. 20, 2007; U.S. Provisional Patent Application Ser. No. 60/982,378, entitled "Nozzles for Contour Crafting of Walls," filed Oct. 24, 2007; and U.S. Provisional Patent Application Ser. No. 60/990,581, filed Nov. 27, 2007, entitled "Methods for Sensing Viscous Fluid Flow Rate," U.S. patent application Ser. No. 11/934,507, entitled "Gantry Robotics System and Related Material Transport for Contour Crafting," filed Nov. 2, 2007; which claims priority to U.S. Provisional Application No. 60/864,293, entitled "Gantry Robotics System and Related Material Transport for Contour Crafting," filed Nov. 3, 2006; U.S. patent application Ser. No. 11/933,985, entitled "Metering and Pumping Devices," filed Nov. 1, 2007; which claims priority to U.S. Provisional Application No. 60/864,060, entitled "Metering and Pumping Devices," filed Nov. 3, 2006; U.S. Pat. No. 7,153,454, entitled "Multi-Nozzle Assembly for Extrusion of Wall," issued Dec. 26, 2006; U.S. Pat. No. 7,452,196, entitled "Automated Plumbing, Wiring, and Reinforcement," issued Nov. 18, 2008; which claims priority to U.S. Provisional Application Ser. No. 60/537,756, entitled "Automated Construction Using Extrusion," filed Jan. 20, 2004; and U.S. Pat. No. 7,574,925, entitled "Metering and Pumping Devices," issued Aug. 18, 2009; which claims priority to U.S. Provisional Application No. 60/864,060, entitled "Metering and Pumping Devices," filed Nov. 3, 2006. The entire content of all of these patent applications and patents is incorporated herein by reference.

STATEMENT REGARDING FEDERALLY SPONSORED RESEARCH

This invention was made with government support under Contract No. N00014-05-1-0850 awarded by the Office of Naval Research. The government has certain rights in the invention.

BACKGROUND

1. Technical Field

This disclosure relates to metering devices for fluids, including abrasive viscous fluids, such as cementitious material.

2. Description of Related Art

Regulating the flow rate of fluids can be challenging, particularly when the fluids are abrasive viscous fluids, such as cementitious material. The abrasive nature of these fluids can also quickly jam or damage the regulating device, particularly when the device has areas in which fluids that contain hardening agents may get trapped. It may also be hard to regulate fluid flow rate when there are changes in the supply pressure.

SUMMARY

A fluid metering device may meter the flow of fluid. The device may have a main chamber and a piston configured and oriented to reciprocate within the main chamber. The piston may be configured and oriented to define a first and a second sub-chamber whose volumes vary inversely as a function of the position of the piston during its reciprocation. The fluid metering device may have a first inlet valve configured to controllably regulate the flow of fluid into the first sub-chamber, a first outlet valve configured to controllably regulate the flow of fluid out of the first sub-chamber, a second inlet valve configured to controllably regulate the flow of fluid into the second sub-chamber, and a second outlet valve configured to controllably regulate the flow of fluid out of the second sub-chamber.

The fluid metering device may have a valve controller connected to each of the valves. The valve controller may be configured to control each of the values in a manner that causes fluid to flow through the each of the sub-chambers at an average rate that substantially tracks a control signal which is delivered to the valve controller.

The valve controller may be configured to control each of the inlet values in a manner that causes the average rate of fluid flow through the each of the sub-chambers not to vary as a function of changes in the pressure of the fluid at the inlet valves, after the pressure exceeds a threshold amount.

The valve controller may be configured not to open both inlet valves at the same time.

The valve controller may be configured not to open both outlet valves at the same time.

The valve controller may be configured to cycle between a first phase during which the first inlet valve and the second outlet valve are open and the second inlet valve and the first outlet valve are closed, and a second phase during which the second inlet valve and the first outlet valve are open and the first inlet valve and the second outlet valve are closed.

The valve controller may be configured to cause the period of the phases to be sufficient to enable the first sub-chamber to completely fill with fluid during the first phase, and the second sub-chamber to completely fill with fluid during the second phase.

The valve controller may be configured to extend the period of the first phase after the first sub-chamber has completely filled with fluid and/or the second phase after the second sub-chamber has completely filled with fluid by an amount which is based on the control signal.

The valve controller may be configured to extend the period of the first phase after the first sub-chamber has completely filled with fluid and the period of the second phase after the second sub-chamber has completely filled with fluid by an equal amount which is based on the control signal.

The fluid metering device may have a distribution inlet configured to distribute fluid entering the distribution inlet to the first and the second inlet valves.

The fluid metering device may have a consolidation outlet configure to consolidate the fluid from the first and second outlet valves into the consolidation outlet.

The piston may be configured to substantially block the flow of fluid between the sub-chambers while reciprocating.

Each of the valves may be configured to operate only in a fully open or a fully closed mode.

Each of the valves may be configured to operate in a fully open mode, a fully closed mode, and in at least one partially open mode.

Each of the valves may be configured to open by vibrating at least a portion of the valve and to close by not vibrating the portion of the valve.

The fluid metering device may have a vibration-absorbing gasket between each valve and its associated sub-chamber.

The fluid metering device may have a stop mechanism configured to limit the movement of the piston.

Each of the sub-chambers may be configured to substantially prevent fluid from entering the sub-chamber, other than through its inlet valve, and from leaving the sub-chamber, other than through its outlet valve.

Each of the sub-chambers and each of the valves may be configured to permit an abrasive viscous fluid, such as cementitious material, to repeatedly flow through them while they are operating without causing a jam or damage to the device.

The fluid metering device may be configured to drive the piston with only the pressure of fluid in the sub-chambers.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
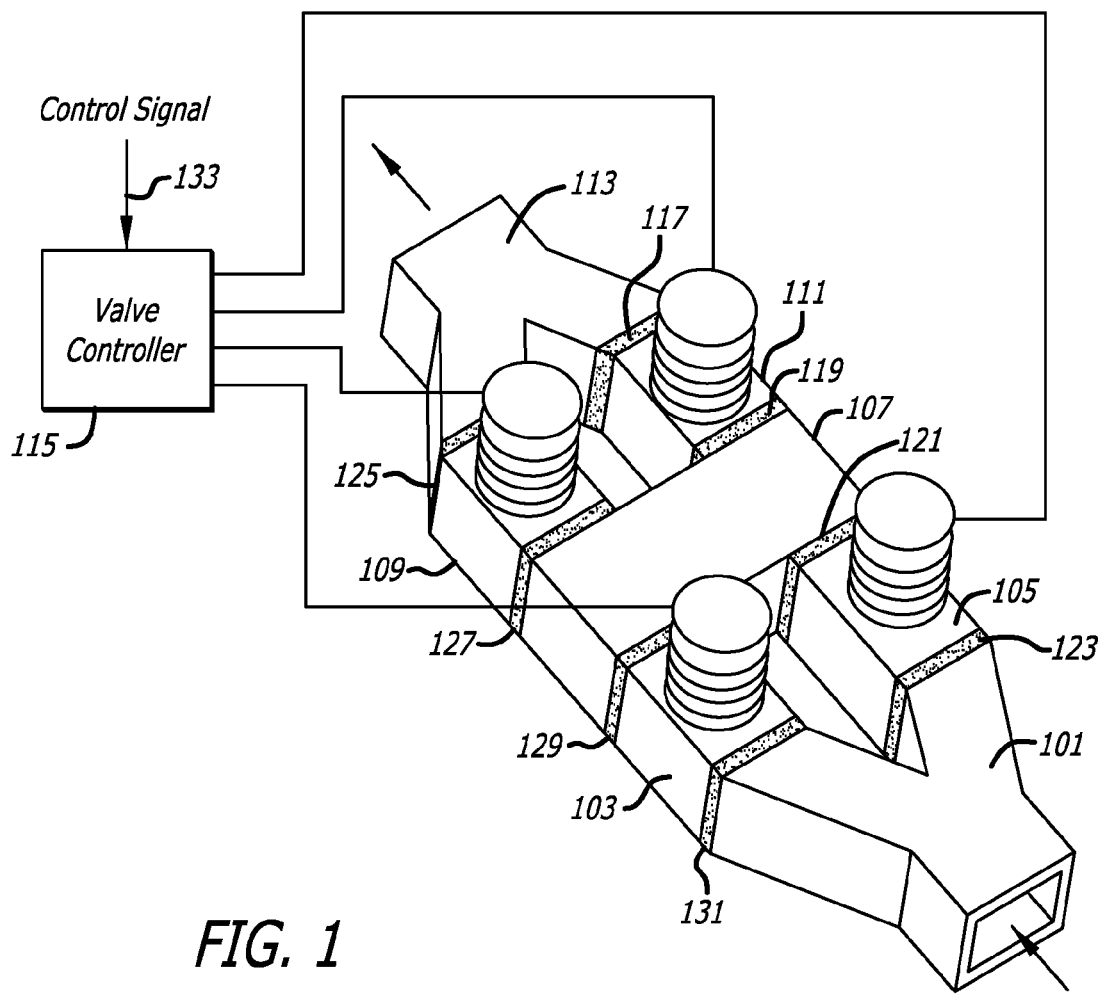
FIG. 1 illustrates a fluid metering device containing two inlet and two outlet valves and a valve controller.

FIG. 1 illustrates a fluid metering device containing two inlet and two outlet valves and a valve controller.

As illustrated in FIG. 1, the fluid metering device may include a distribution inlet 101, a first inlet valve 103, a second inlet valve 105, a main chamber 107, a first outlet valve 109, a second outlet valve 111, a consolidation outlet 113, and a valve controller 115. Gaskets 117, 119, 121, 123, 125, 127, 129, and 131 may be between various components, as also illustrated in FIG. 1.

Figure 2A:
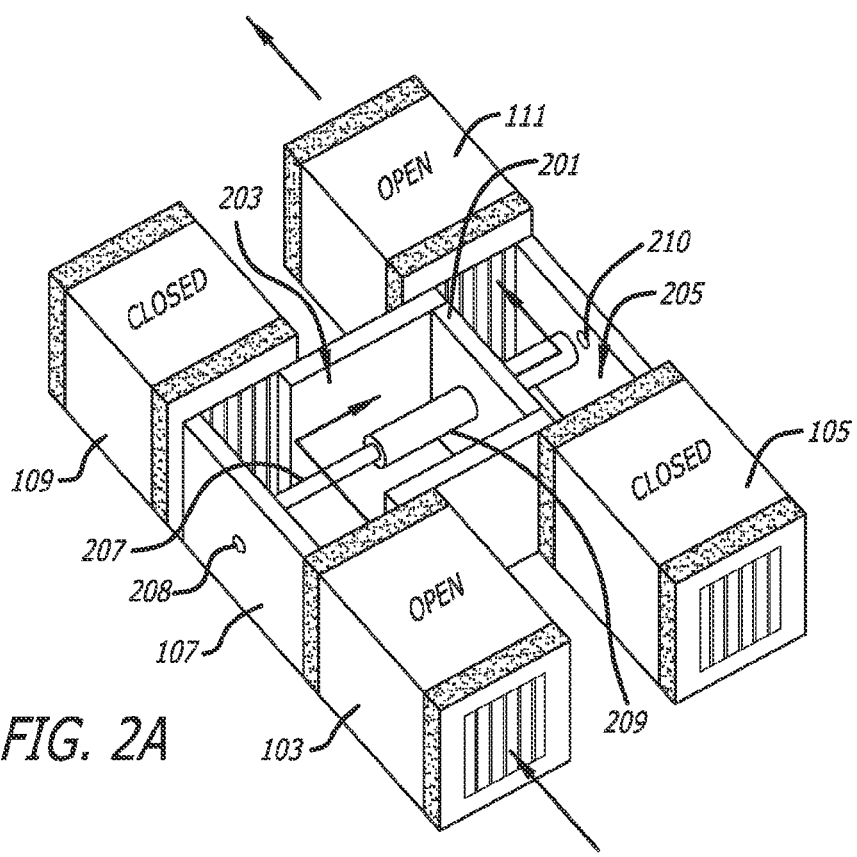
FIG. 2a illustrates a portion of the fluid metering device in FIG. 1 with the top removed from the main chamber during an operational phase when a first inlet valve and a second outlet valve are open and the other valves are closed.
Figure 2B:
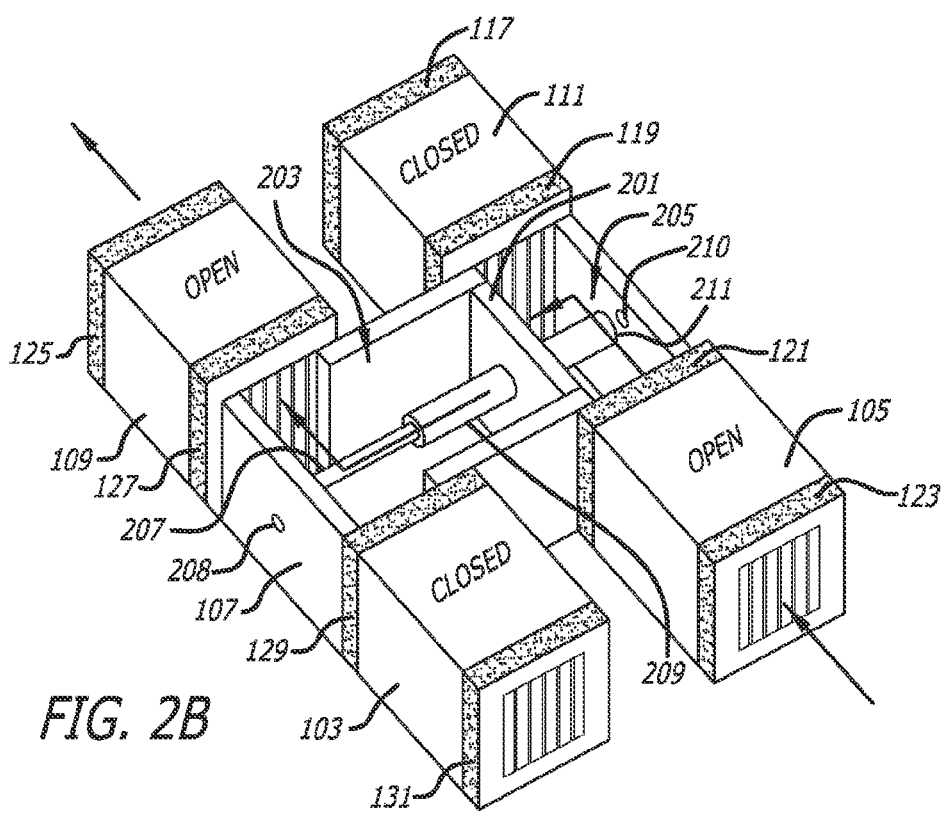
FIG. 2b illustrates a portion of the fluid metering device in FIG. 1 with the top removed from the main chamber during an operational phase when a second inlet valve and a first outlet valve are open and the other valves are closed.

FIG. 2a illustrates a portion of the fluid metering device in FIG. 1 with the top removed from the main chamber during an operational phase when a first inlet valve and a second outlet valve are open and the other valves are closed. FIG. 2b illustrates a portion of the fluid metering device in FIG. 1 with the top removed from the main chamber during an operational phase when a second inlet valve and a first outlet valve are open and the other valves are closed.

As illustrated in FIGS. 2a and 2b, a piston 201 may be configured and oriented to reciprocate within the main chamber 107. The piston 201 may be configured and oriented to define a first sub-chamber 203 and a second sub-chamber 205 whose volumes may vary inversely as a function of the position of the piston 201 during reciprocation.

The piston 201 may be configured to substantially block the flow of fluid between the first sub-chamber 203 and the second sub-chamber 205.

The piston 201 may be guided during its reciprocation by a central guide rod 207. A different guide mechanism may be provided in addition or instead. The piston 201 may instead be used without any guide mechanism.

A stop mechanism may be provided and configured to limit the movement of the piston 201. The stop mechanism may take any form. For example, the stop mechanism may include a sleeve on each side of the piston 201 surrounding the central guide rod 207, such as a sleeve 209 and a sleeve 211. The sleeves 209 and 211 may be attached to the piston 201 so as to provide additional support for the piston 201 during its reciprocation.

Means other than sleeves may be used for the stop mechanism. For example, one or more protrusions may be provided on the walls of each of the sub-chambers to prevent the piston 201 from blocking the flow of fluid from the inlet valve to the outlet valve for that sub-chamber.

The fluid metering device may be configured to drive the piston with only the pressure of fluid in the sub-chambers, as illustrated in FIGS. 2a and 2b. The piston 201 may in addition or instead be driven, such as by a drive shaft connected to a driving mechanism.

The sub-chambers 203 and 205 may each be configured to substantially prevent fluid from entering the sub-chamber, other than through its associated inlet valve, and from leaving the sub-chamber, other than through its associated outlet valve.

The first inlet valve 103 may be configured to controllably regulate the flow of fluid into the first sub-chamber 203, and the first outlet valve 109 may be configured to controllably regulate the flow of fluid out of the first sub-chamber 203. Similarly, the second inlet valve 105 may be configured to controllably regulate the flow of fluid into the second sub-chamber 205, and the second outlet valve 111 may be configured to controllably regulate the control of fluid out of the second sub-chamber 205.

Each of the valves 103, 105, 109, and 111 may be of any type. They may all be of the same type or of different types. Each may be configured to be actuated by electricity, air, fluid, mechanical linkage, by other means, or by a combination of these means.

One, some, or all of the valves may be configured to operate in only a fully open or a fully closed mode. One, some, or all of the valves may also be configured to operate in at least one partially open mode. One, some, or all of the valves may also be configured to operate in numerous partially-open modes, each to a different degree.

One, some, or all of the valves may be configured to open by vibrating at least a portion of the valve and to close by not vibrating the portion of the valve. One example of such a valve is illustrated in FIG. 10 of U.S. pre-grant publication 2007/0138678, entitled "Extruded Wall with Rib-Like Interior," filed Oct. 25, 2006, the content of which is incorporated herein by reference. As described in this pre-grant publication, the vibrating valve may be configured so as to regulate the amount of flow through the vibrating valve based on the amount of vibration. As also explained in this pre-grant publication, any type of vibration-generating device may be used to actuate the valve, such as one or more piezo-ceramic discs. As also described in this pre-grant publication, the vibration-generating device may vibrate at any frequency, such as at a frequency of between 1-20 kHz. The vibration may be in any direction, such as perpendicular to the flow of material, parallel to the flow of the material, at another angle with respect to the flow of material, or at more than one angle with respect to the flow of the material.

The gaskets 117, 119, 121, 123, 125, 127, 129, and 131 may be made of material that seals the components which abut each gasket. The material may also absorb vibration so as to help isolate the main chamber 107, the sub-chambers 203 and 205, the distribution inlet 101, and the consolidation outlet 113 from vibration that is produced by the valves 103, 105, 109, and/or 111. For example, the material may be rubber.

The valve controller 115 may be connected to each of the valves 103, 105, 109, and 111. The valve controller 115 may be configured to control each of the valves in a manner that causes fluid to flow to the distribution inlet 101 through each of the sub-chambers 203 and 205 and out through the consolidation outlet 113 at an average rate that substantially tracks a control signal 133 which is delivered to the valve controller 115.

The control signal 133 may be of any type. It may be an analog signal having a voltage which is proportional to the desired average flow rate. In another embodiment, the control signal 133 may be a digital signal having a value which is indicative of the desired average flow rate. In either case, the valve controller 115 may be configured to control each of the valves so as to cause the average flow rate of fluid through the sub-chambers 203 and 205 to substantially match the average flow rate dictated by the control signal 133.

The valve controller 115 may be configured to control the valves in any manner so as to effectuate this result. The valve controller 115 may be configured to control each of the inlet valves in a manner which causes the average rate of fluid flow through each of the sub-chambers not to vary as a function of changes in the pressure of the fluid at the inlet valve after that pressure exceeds a threshold amount. Changes in the inlet pressure, however, may cause momentary changes in the flow rate, as they may alter the speed of the piston 201 when it traverses.

In one configuration, the valve controller 115 may be configured not to open both inlet valves or both outlet valves at the same time.

The valve controller 115 may be configured to cycle between a first phase and a second phase.

As illustrated in FIG. 2a, the valve controller 115 may be configured during the first phase to open the first inlet valve and the second outlet valve 111 and to close the second inlet valve 105 and the first outlet valve 109. This may enable fluid to flow into the first sub-chamber 203 through the first inlet valve 103. Since the first outlet valve 109 may be closed during this time, the fluid flowing into the first sub-chamber 203 may push upon a wall of the piston 201, causing the piston 201 to move to the right, as illustrated in FIG. 2a. Since the second inlet valve 105 may be closed at this time, movement of the piston 201 to the right may cause fluid which was stored in the second sub-chamber 205 to be pushed out of the second outlet valve 111. The piston 201 may continue to move to the right until the stop mechanism stops the left-to-right movement of the piston 201, such as when the sleeve 211 comes in contact with the right wall of the main chamber 107. When this happens, a metered about of fluid will have been squeezed out of the second outlet valve 111. The amount may be substantially independent of the pressure of the fluid at the first inlet valve 103.

The valve controller may be configured to maintain the state of the valves during the first phase, even after the stop mechanism has stopped the left-to-right movement of the piston 201. During this dwell time, all fluid flow may be at a standstill. The amount of this dwell time may be based on the control signal 133. If the control signal is indicating a very fast average flow rate, for example, the dwell time may be very short. If the control signal is indicating a very slow average flow rate, on the other hand, the dwell time may be very long.

As illustrated in FIG. 2b, the valve controller 115 may be configured to perform the reverse process during the second phase. Specifically, the valve controller 115 may be configured during the second phase to open the second inlet valve and the first outlet valve 111 and to close the first inlet valve 105 and the second outlet valve 109. This may enable fluid to flow into the second sub-chamber 205 through the second inlet valve 105. Since the second outlet valve 111 may be closed during this time, the fluid flowing into the second sub-chamber 205 may push upon a wall of the piston 201, causing it to move to the left, as illustrated in FIG. 2b. Since the first inlet valve 105 may be closed at this time, movement of the piston 201 to the left may cause fluid which was stored in the first sub-chamber 203 to be pushed out of the first outlet valve 109. The piston 201 may continue to move to the left until the stop mechanism stops the right-to-left movement of the piston 201, such as when the sleeve 209 comes in contact with the left wall of the main chamber 107. When this happens, a metered about of fluid will have been squeezed out of the first outlet valve 109. This may again be substantially independent of the pressure of the fluid at the second inlet valve 105.

The valve controller may similarly be configured to maintain the state of the valves during in the second phase, even after the stop mechanism has stopped the right-to-left movement of the piston 201. During this dwell time, all fluid flow may again be at a standstill. The amount of this dwell time may be based on the control signal 133. If the control signal is indicating a very fast average flow rate, for example, the dwell time may be very short. If the control signal is indicating a very slow average flow rate, on the other hand, the dwell time may be very long.

The valve controller 115 may be configured to cause the period of the first phase to always be sufficient to enable the first sub-chamber 203 to completely fill with fluid during the first phase. The valve controller 115 may similarly be configured to cause the period of the second phase to always be sufficient to enable the second sub-chamber 205 to completely fill with fluid during the second phase.

As may now be apparent, when fluid is filing one sub-chamber, other fluid is exiting the other sub-chamber. If the valve controller 115 is configured to always insure that each sub-chamber is completely filled during its filling phase, the amount of fluid which exits the fluid metering device during each stroke of the piston will always be the same, namely the volume of fluid which was contained in the portion of the sub-chamber which collapsed during that piston stroke.

Once the piston 201 has reached the end of each stroke, continuing the state of the four valves after the piston 201 made the stroke will have no further effect on fluid flow. The net average flow of fluid through the fluid metering device may thus be precisely regulated by the valve controller 115 by regulating the amount of dwell time that the valves are allowed to remain in their state after a sub-chamber has completely filled with fluid. The longer the dwell time, the lower the average flow rate. Conversely, the shorter the dwell time, the faster the average flow rate.

Alternation between the first and the second phases may always be slow enough to enable both sub-chambers to completely fill during their respective filling phase. When this occurs, the average flow rate of fluid through the fluid metering device will be substantially unaffected by changes in pressure of the fluid at the inlet valves. That input pressure, however, may need to be at a threshold level in order to cause the fluid to flow into the sub-chambers and in order to cause the fluid to completely fill the sub-chambers within the minimum dwell time permitted by the valve controller 115.

The valve controller 115 may instead be configured to switch between the two phases at a rate which is insufficient to allow one or both of the sub-chambers to completely fill. Although this mode of operation may also effectuate fluid metering, the metering may not be substantially independent of fluid input pressure.

As may now be apparent, the fluid metering device which is illustrated in FIGS. 1, 2a and 2b may regulate the flow of fluid through the device, substantially independent of fluid input pressure, in a wholly open-loop manner. For example, there may be no sensors which are configured to sense the actual output flow rate. Even if feedback is available, the valve controller 115 may not take it into consideration when controlling the valves.

In another embodiment, an output flow sensor may be provided and the signal from the output flow sensor may be used to regulate the drive signals generated by the valve controller 115.

In a still further embodiment, one or more sensors may be provided to provide feedback to the valve controller 115 concerning the position of the piston 201. For example, one or more sensors 208 and 210 may be provided which detect when the piston 201 has reached the end of each stroke. The valve controller 115 may in turn be configured to ensure that each of its two phases lasts long enough so that the sub-chambers completely fill with fluid during each phase. To accomplish this, the valve controller 115 may be configured to continue each phase until the valve controller 115 receives a signal from the sensor associated with that phase indicating that the piston 115 has reached the end of its stroke. The feedback from these piston position sensors may also assist the valve controller 115 in setting the maximum average flow rate which it may effectuate.

Any type of device may be used to sense the position of the piston 201. For example, a magnet may be placed on the piston 201 and a Hall sensor may be placed at the end of each traverse. Mechanical run-out switches may be provided in addition or instead.

The fluid metering device may be configured to meter the flow of any type of fluid. For example, the fluid metering device may be configured to regulate the flow of an abrasive viscous fluid, such as cementitious material. To facilitate this, the sub-chambers 203 and 205 and each of the valves 103, 105, 109, and 111, may be configured to permit such abrasive viscous fluid, such as cementitious material, to repeatedly flow through them while they are operating without causing a jam or damage to the component. The use of one of the vibrating valves which are discussed above may be appropriate for this application.

The various components which are used in the fluid metering device may be sized and shaped to facilitate the metering of such abrasive viscous fluids, such as cementitious material. Although only rectangular shapes are illustrated in FIGS. 1, 2a, and 2b, other shapes may be used instead, such as cylindrical or triangular.

The various components of the fluid metering device may be made of any material. For example, one, some, or all of the components may be made of metal, plastic, ceramic, or a combination of these types of material.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the piston may reciprocate between its positions be pivoting between two positions, as opposed to moving linearly as illustrated in FIGS. 2A and 2B.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A fluid metering device for metering the flow of fluid comprising:
    a main chamber;
    a piston configured and oriented to reciprocate within the main chamber and to define a first and a second sub-chamber whose volumes vary inversely as a function of the position of the piston during its reciprocation;
    a first inlet valve configured to controllably regulate the flow of fluid into the first sub-chamber;
    a first outlet valve configured to controllably regulate the flow of fluid out of the first sub-chamber;
    a second inlet valve configured to controllably regulate the flow of fluid into the second sub-chamber;
    a second outlet valve configured to controllably regulate the flow of fluid out of the second sub-chamber;
    one or more sensors configured to provide feedback indicative of the position of the piston within the chamber; and
    a valve controller connected to each of the valves and configured to control each of the valves in a manner that causes fluid to flow through the each of the sub-chambers at an average rate that substantially tracks a control signal which is delivered to the valve controller, wherein the valve controller is configured to control each of the valves based on the feedback provided by the one or more sensors,
    wherein:
        the valve controller is configured to cycle between:
            a first phase during which the first inlet valve and the second outlet valve are open and the second inlet valve and the first outlet valve are closed; and
            a second phase during which the second inlet valve and the first outlet valve are open and the first inlet valve and the second outlet valve are closed; and
        the valve controller is configured to cause the period of the phases to be sufficient to enable:
            the first sub-chamber to completely fill with fluid during the first phase; and
            the second sub-chamber to completely fill with fluid during the second phase; and
        the valve controller is configured to cause fluid to flow through each of the sub-chambers at the average rate by extending the period of:
            the first phase after the first sub-chamber has completely filled with fluid by an amount which is based on the control signal; or
            the second phase after the second sub-chamber has completely filled with fluid by an amount which is based on the control signal, and
        wherein each of the sub-chambers and each of the controllable valves are configured to permit cementitious material to repeatedly flow through them while they are operating without causing a jam or damage to the device; and
    wherein each of the valves are configured to open by vibrating at least a portion of the valve and to close by not vibrating the portion of the valve.

2. The fluid metering device of claim 1 wherein the valve controller is configured to control each of the inlet valves in a manner that causes the average rate of fluid flow through the each of the sub-chambers not to vary as a function of changes in the pressure of the fluid at the inlet valves after the pressure exceeds a threshold amount.

3. The fluid metering device of claim 1 wherein the valve controller is configured not to open the inlet valves at the same time.

4. The fluid metering device of claim 1 wherein the valve controller is configured not to open the outlet valves at the same time.

5. The fluid metering device of claim 1 wherein the valve controller is configured to cause fluid to flow through each of the sub-chambers at the average rate by extending the period of the first phase after the first sub-chamber has completely filled with fluid and by extending the period of the second phase after the second sub-chamber has completely filled with fluid by an equal amount which is based on the control signal.

6. The fluid metering device of claim 1 further comprising a distribution inlet configured to distribute fluid entering the distribution inlet to the first and the second inlet valves.

7. The fluid metering device of claim 6 further comprising a consolidation outlet configure to consolidate the fluid from the first and second outlet valves into the consolidation outlet.

8. The fluid metering device of claim 1 wherein the piston is configured to substantially block the flow of fluid between the sub-chambers while reciprocating.

9. The fluid metering device of claim 1 wherein each of the valves are configured to operate only in a fully open or a fully closed mode.

10. The fluid metering device of claim 1 wherein each of the inlet valves are configured to operate in a fully open mode, a fully closed mode, and in at least one partially open mode.

11. The fluid metering device of claim 1 further comprising a vibration-absorbing gasket between each valve and its associated sub-chamber.

12. The fluid metering device of claim 1 further comprising a stop mechanism configured to limit the movement of the piston.

13. The fluid metering device of claim 1 wherein each of the sub-chambers are configured to substantially prevent fluid from entering the sub-chamber other than through its inlet valve and from leaving the sub-chamber other than through its outlet valve.

14. The fluid metering device of claim 1 wherein each of the sub-chambers and each of the valves are configured to permit an abrasive viscous fluid to repeatedly flow through them while they are operating without causing a jam or damage to the device.

15. The fluid metering device of claim 1 wherein the fluid metering device is configured to drive the piston only with the pressure of fluid in the sub-chambers.

16. The fluid metering device of claim 1 wherein:
    the piston is configured to reciprocate between two opposing ends of the main chamber;
    the one or more sensors are configured to detect when the piston has reached each opposing end of the main chamber; and
    the controller is configured to control each of the valves based on the feedback from the one or more sensors so as to cause the piston to fully reciprocate between each opposing end of the main chamber.

\* \* \* \* \*